G. C. BARTLETT.
Potato-Digger.
No. 29,339.
Patented July 24, 1860.
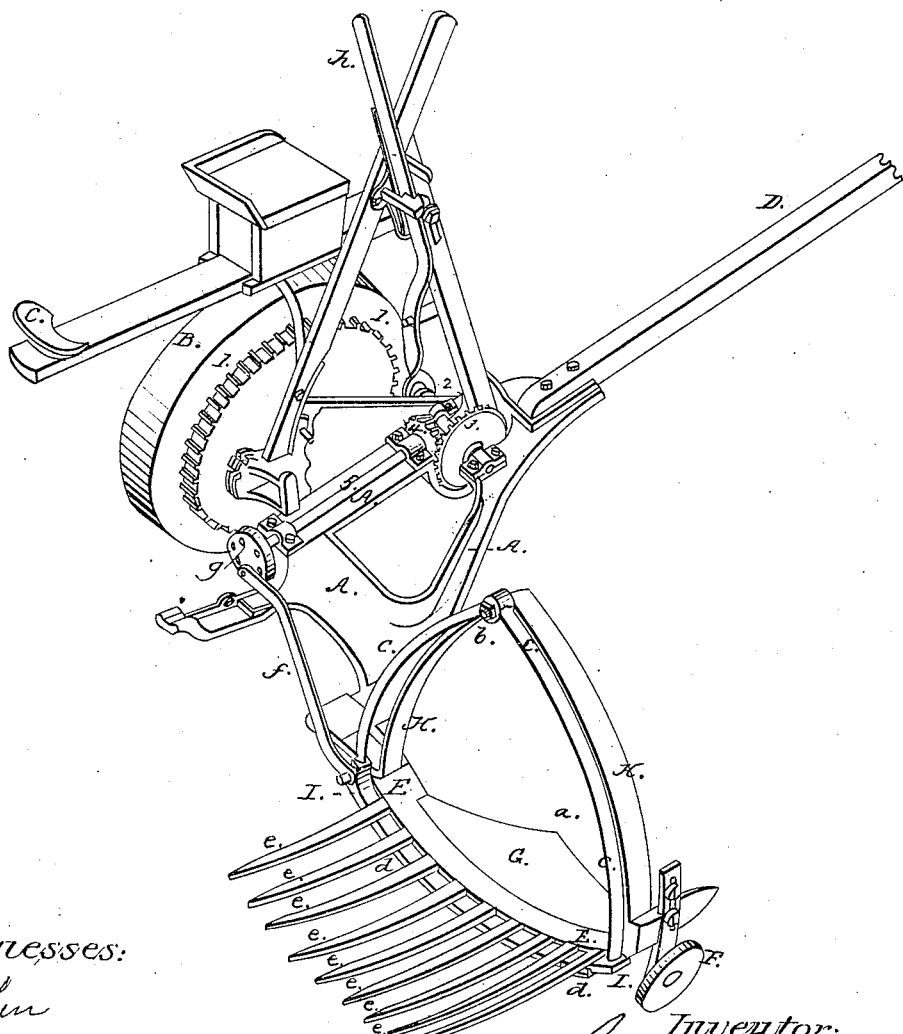
Witnesses:
E. Cohen
I. Hirsch
Inventor:
George C. Bartlett
per atty A. B. Stoughton

UNITED STATES PATENT OFFICE.

GEORGE C. BARTLETT, OF PARIS, ASSIGNOR TO DAVID M. OSBORNE & CO., OF AUBURN, NEW YORK.

IMPROVEMENT IN POTATO-DIGGERS.

Specification forming part of Letters Patent No. 29,339, dated July 24, 1860.

*To all whom it may concern:*

Be it known that I, GEORGE C. BARTLETT, of Paris, in the county of Oneida and State of New York, have invented certain new and useful Improvements in Machines for Digging Potatoes; and I do hereby declare the following to be a full, clear, and exact description of the construction and operation of the same, reference being had to the accompanying drawing, making a part of this specification, and which represents in perspective my potato-digger as applied to what is known as a "Kirby Harvester," though it may be applied to any other carriage, wagon, or driving or carrying wheels as well, it being shown in this connection simply to elucidate how the frame and driving-gear of a harvesting-machine may by detaching its cutting apparatus be used for another and entirely different agricultural implement by connecting a digger and its bar and a vibrating-shaker behind it for throwing the potatoes to the top of the ground.

My invention consists, first, in a shovel or digger and a vibrating shaker immediately behind it, both working under the earth, though the rear of the shaker may be at or slightly above the surface, the object being to cause the shovel to dig or raise up the earth as well as the potatoes, and the shaker to receive both, but to separate and throw the potatoes to the surface; and my invention further consists in hanging the shaker by a bail above the ground, so that its hinged or pivoted joint shall not be clogged by the earth, while the shaker is free to work under the earth.

To enable others skilled in the art to make and use my invention, I will proceed to describe the same with reference to the drawings, though I do not, as before stated, confine my invention to such a carriage and driving apparatus as is herein shown, meaning to apply it to any other kind of carriage or driving apparatus.

A is a main frame, hung to and supported by a driving and carrying wheel, B. C is a driver's seat, and D a tongue to which the team that is to operate the machine is hitched.

E is a bar firmly attached to the frame A and projecting from it, and has a supporting-wheel, F, at its outer end, which can be adjusted to any suitable height. This bar E is curved downward throughout the greater part of its length, and has fitted to its front edge a curved shoe, digger, or shovel, G, whose edge at or near the center of its length may come to a point, *a*, and incline both ways from that point. This shoe, digger, or shovel passes under the hills or rows of potatoes and raises them up, and its curvature is designed to prevent the lifting or removing of more earth than is actually necessary to throw out the potatoes.

H is an arch-piece extending from the inner to the outer end of the bar E, and connected thereto. It is high enough above said bar E to allow the earth, vines, or weeds to pass under it without clogging or choking. At the top of this arch-piece H is hung by a pivot or pin, *b*, the bail *c*, which extends down and supports the shaker-bar I, which is curved to correspond with the curve of the shovel G and its bar E. The shaker-bar vibrates transversely through guides *d d*, fastened to the bar E, and has upon it a series of fingers, *e e*, with spaces between, so that it will screen and shake the earth through between the fingers, while the potatoes are thrown on top and delivered at the rear of the shaker. The shaker-bar I is connected to one end of a pitman, *f*, the other end of said pitman being connected to a crank-wheel, *g*, that gets its motion from the main drive-wheel B through the cog-gear 1, (a pinion not seen in the drawing, but on the shaft 2,) shaft 2, bevel-gear 3, bevel-pinion 4, shaft 5, and crank-wheel *g*.

*h* is a lever connected with a clutch for throwing the pinion in and out of gear with the main drive-wheel B.

The digger and shaker may be readily attached to a harvesting-machine, which makes it a very cheap contrivance; but of course a carrying and driving apparatus may be specially made for and connected with the digger and shaker if so preferred, and I should claim the shovel or digger and shaker, as I construct and operate them without regard to any special kind of carriage or driving-gear, so long as the shaker works across the path of the shovel.

Having thus fully described my potato-digger, what I claim therein as new is—

1. The combination of the shovel or digger and shaker, one arranged immediately in rear of the other, so that the shaker shall receive from the shovel all that the shovel digs up and sift or riddle it, throwing the potatoes on top, substantially as described.

2. Suspending and vibrating the shaker from and around a point, pivot, or pin, $b$, that is high enough above the ground not to be interfered with by the dirt, vines, weeds, &c., substantially as described.

GEO. C. BARTLETT.

Witnesses:
  DAVID LARRAHUE,
  D. W. LARRAHUE.